(12) United States Patent
Kato et al.

(10) Patent No.: US 9,810,168 B2
(45) Date of Patent: Nov. 7, 2017

(54) CONTROL APPARATUS FOR VEHICLE AND CONTROL METHOD FOR ENGINE

(71) Applicant: TOYOTA JIDOSHA KABUSHIKI KAISHA, Toyota-shi, Aichi-ken (JP)

(72) Inventors: Hirokazu Kato, Nisshin (JP); Jumpei Kakehi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/037,355

(22) PCT Filed: Nov. 20, 2014

(86) PCT No.: PCT/IB2014/002504
§ 371 (c)(1),
(2) Date: May 18, 2016

(87) PCT Pub. No.: WO2015/075534
PCT Pub. Date: May 28, 2015

(65) Prior Publication Data
US 2016/0273468 A1    Sep. 22, 2016

(30) Foreign Application Priority Data

Nov. 25, 2013    (JP) .................................. 2013-243074

(51) Int. Cl.
*F02D 41/06* (2006.01)
*B60T 7/12* (2006.01)
(Continued)

(52) U.S. Cl.
CPC .............. *F02D 41/062* (2013.01); *B60T 7/12* (2013.01); *B60T 7/22* (2013.01); *B60W 30/16* (2013.01);
(Continued)

(58) Field of Classification Search
CPC ........ F02D 41/062; F02D 41/042; B60T 7/22; B60T 7/12; B60T 2201/022; B60W 30/16;
(Continued)

(56) References Cited

U.S. PATENT DOCUMENTS 6,470,257 B1 * 10/2002 Seto ................... B60K 31/0008
701/96
6,985,805 B2 * 1/2006 Sudou ................ B60K 31/0008
180/170

(Continued)

FOREIGN PATENT DOCUMENTS

DE        19502154 A1    8/1996
DE    102005009929 A1    9/2006
(Continued)

OTHER PUBLICATIONS

English translation of JP 2012-086795A.*

*Primary Examiner* — Joseph Dallo
(74) *Attorney, Agent, or Firm* — Oliff PLC

(57) ABSTRACT

A control apparatus for a vehicle includes: an inter-vehicle distance control unit that performs an inter-vehicle distance control with respect to a preceding vehicle; an engine stop-start unit that stops the engine when an engine stop condition is satisfied and starts the engine when an engine start condition is satisfied; a vehicle stop state maintenance unit that maintains a braking force for stopping the vehicle; the engine stop-start unit stops the engine, by activation of the vehicle stop state maintenance unit in the case where the vehicle is stopped by the inter-vehicle distance control unit; and an engine operation control unit that, in the case where the inter-vehicle distance control unit is set to be active in the vehicle stop state, maintains the operation state of the engine before the inter-vehicle distance control unit is set to be active.

8 Claims, 12 Drawing Sheets

(51) Int. Cl.
*B60W 30/16* (2012.01)
*B60W 30/17* (2012.01)
*B60W 30/18* (2012.01)
*B60T 7/22* (2006.01)
*F02D 41/04* (2006.01)

(52) U.S. Cl.
CPC ...... *B60W 30/17* (2013.01); *B60W 30/18018* (2013.01); *B60W 30/18118* (2013.01); *F02D 41/042* (2013.01); *B60T 2201/022* (2013.01)

(58) Field of Classification Search
CPC ........... B60W 30/17; B60W 30/18018; B60W 30/18118
See application file for complete search history.

(56) References Cited

U.S. PATENT DOCUMENTS

| | | | |
|---|---|---|---|
| 7,734,403 B2 | 6/2010 | Baijens et al. | |
| 7,890,243 B2 | 2/2011 | Abendroth | |
| 8,078,382 B2* | 12/2011 | Sugano | B60W 10/06 180/170 |
| 8,532,843 B2* | 9/2013 | Nagura | F02N 11/0837 123/179.4 |
| 2006/0212207 A1* | 9/2006 | Sugano | B60W 10/06 701/93 |
| 2007/0215577 A1 | 9/2007 | Park | |
| 2008/0133103 A1 | 6/2008 | Meske et al. | |
| 2010/0286887 A1* | 11/2010 | Maruyama | B60T 7/22 701/96 |
| 2011/0169323 A1 | 7/2011 | Tseng et al. | |
| 2016/0200319 A1* | 7/2016 | Nemoto | B60W 10/04 701/96 |
| 2016/0200321 A1* | 7/2016 | Yamada | B60W 10/06 701/96 |

FOREIGN PATENT DOCUMENTS

| | | |
|---|---|---|
| DE | 102007012123 A1 | 10/2007 |
| DE | 102007061940 A1 | 11/2008 |
| DE | 102008001691 A1 | 11/2009 |
| JP | 2000-303871 A | 10/2000 |
| JP | 2005-291214 A | 10/2005 |
| JP | 2012086795 A * | 5/2012 |
| JP | 2012-206593 A | 10/2012 |

* cited by examiner

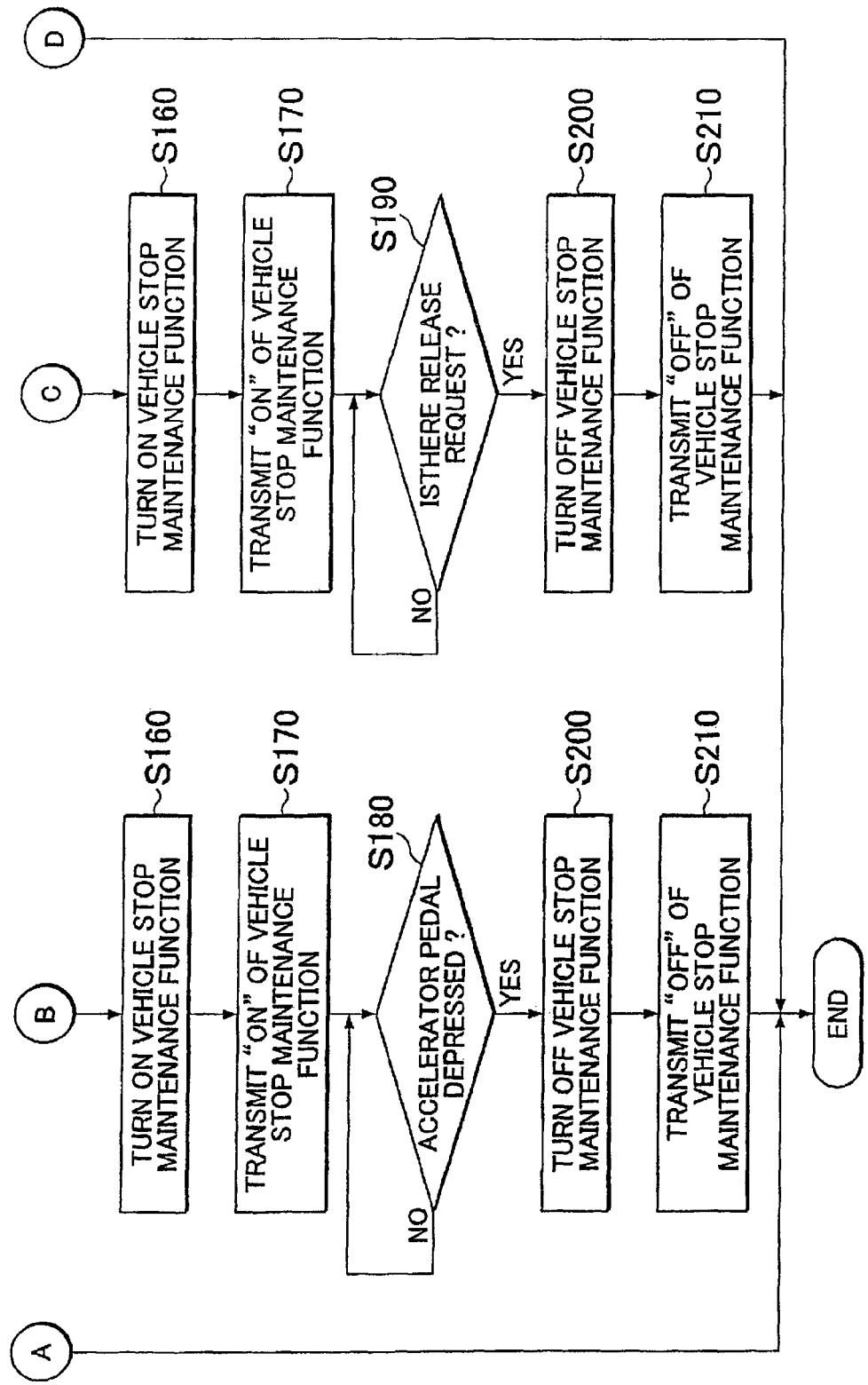

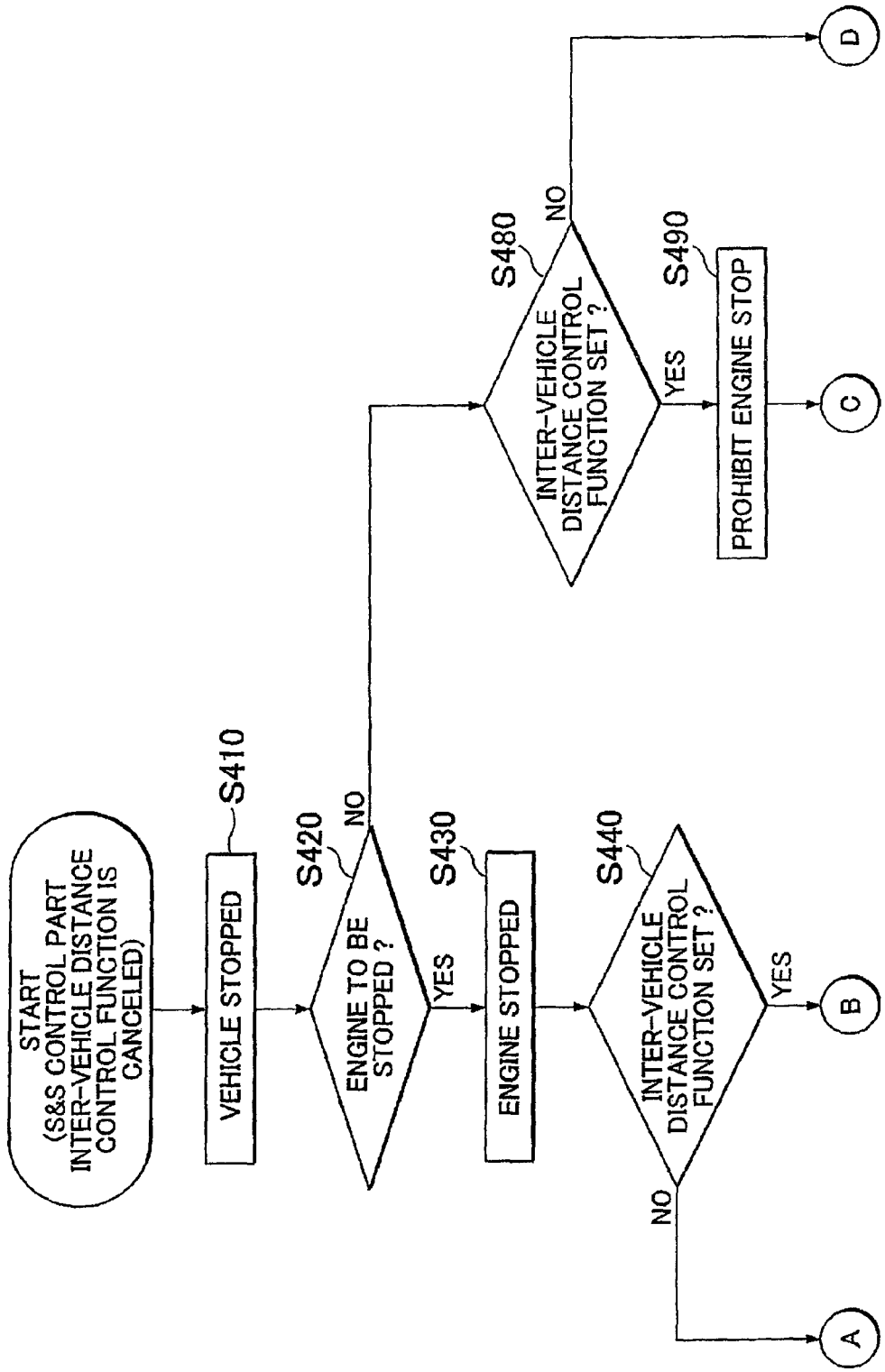

CONTROL APPARATUS FOR VEHICLE AND CONTROL METHOD FOR ENGINE

BACKGROUND OF THE INVENTION

1. Field of the Invention

The present invention relates to a control apparatus for a vehicle, that has an inter-vehicle distance control unit, an engine stop-start unit, and a vehicle stop state maintenance unit.

2. Description of Related Art

An idle-stop technology in which the engine is stopped when the vehicle is stopped by the driver's operation of a brake pedal is known. In addition, there has been known a technology in which the stopped engine is started by the idle-stop technology when the driver's foot is moved away from the brake pedal. Both the technologies are collectively called idle-stop function, start & stop function, engine • automatically • start • stop function, or the like (hereinafter, simply referred to as "idle-stop function").

In addition, there has been known a technology in which a traveling following a preceding vehicle with an inter-vehicle distance corresponding to vehicle speed is performed while the preceding vehicle is captured, and a traveling at a preset constant speed is performed if no preceding vehicle is captured, and which is referred to as constant-speed traveling • inter-vehicle distance control function and/or ACC (Adaptive Cruise Control) or the like (hereinafter, referred to as "inter-vehicle distance control function"). Moreover, a full vehicle speed range inter-vehicle distance control function in which the host vehicle is also stopped if the preceding vehicle is slowed down to stop and the host vehicle is also started if the preceding vehicle is started, is known as a mode of the inter-vehicle distance control function.

In addition, there has been known a technology in which the braking state of the vehicle is maintained even if the driver moves his foot away from the brake pedal after the vehicle has stopped, and which is called braking hold function and/or hill-start assistance (hereinafter, simply referred to as "vehicle stop maintenance function"), or the like. By this technology, the driver does not need to depress the brake pedal in the case of waiting for the traffic lights, etc., so the driver's fatigue can be alleviated.

By equipping the vehicle with the idle-stop function, the full vehicle speed range inter-vehicle distance control function, and the vehicle stop maintenance function, the idle-stop function is capable of stopping the engine after the host vehicle is stopped by the full vehicle speed range inter-vehicle distance control function (for example, refer to Japanese Patent Application Publication No. 2012-206593 (JP 2012-206593 A)). In JP 2012-206593 A, a cruise control system is disclosed, in which when the host vehicle is stopped by the full vehicle speed range inter-vehicle distance control function, a holding force for keeping the vehicle in the stop state is generated, and the engine of the host vehicle is automatically stopped when a condition to automatically stop the engine is satisfied.

However, if the vehicle equipped with the idle-stop function and the full vehicle speed range inter-vehicle distance control function is further equipped with the vehicle stop maintenance function, the driver may feel uncomfortable.

It will be explained below. As described in JP 2012-206593 A, in the case where the vehicle has been stopped by the full vehicle speed range inter-vehicle distance control function, stopping the engine by the idle-stop function helps to improve the fuel economy. In addition, by activating the vehicle stop maintenance function in the case where the vehicle has been stopped by the full vehicle speed range inter-vehicle distance control function, a braking force can be held during a period until the engine is started by the idle-stop function.

Therefore, in the vehicle equipped with the idle-stop function, the full vehicle speed range inter-vehicle distance control function and the vehicle stop maintenance function, it is deemed to be reasonable to take the activation of the vehicle stop maintenance function, in place of depression of the brake pedal by the driver, as an engine stop condition of the idle-stop function.

That is, the thus set vehicle operates as follows. The full vehicle speed range inter-vehicle distance control function is set (set to be active)→ the activation condition of the idle-stop function is changed to the activation of vehicle stop maintenance function→ the vehicle is stopped by the full vehicle speed range inter-vehicle distance control function→ the vehicle stop maintenance function is activated→ the engine is stopped by the idle-stop function. However, if the activation of vehicle stop maintenance function is used as the engine stop condition of the idle-stop function when the full vehicle speed range inter-vehicle distance control function is set, the following situations sometimes occur. Firstly, before the full vehicle speed range inter-vehicle distance control function is set by the driver, the brake pedal may be operated by the driver to slow down and stop the vehicle, however, the engine will not be stopped if a depression of the brake pedal with a predetermined depression force or above is not detected by the idle-stop function. Thus, it is possible for the driver to adjust according to his willing whether or not the engine is to be stopped by the idle-stop function.

However, if the full vehicle speed range inter-vehicle distance control function is set when the vehicle has been stopped and the engine is driving, the vehicle stop maintenance function is activated to stop the engine by the idle-stop function. Thus, in the case where the driver does not recognize that the setting of the full vehicle speed range inter-vehicle distance control function may become an activation switch of the idle-stop function, the driver may mistakenly think that the engine is stopped due to a malfunction (may feel uncomfortable).

SUMMARY OF THE INVENTION

The present invention provides a control apparatus for a vehicle which is capable of appropriately controlling the inter-vehicle distance control function, the vehicle stop maintenance function and the idle-stop function without making the user feel uncomfortable.

A first aspect of the present invention relates to a control apparatus for a vehicle. The control apparatus includes: an inter-vehicle distance control unit that performs an inter-vehicle distance control with respect to a preceding vehicle; an engine stop-start unit that stops the engine when an engine stop condition is satisfied and starts the engine when an engine start condition is satisfied; a vehicle stop state maintenance unit that maintains a braking force for stopping the vehicle, wherein the engine stop-start unit stops the engine, by activation of the vehicle stop state maintenance unit in the case where the vehicle is stopped by the inter-vehicle distance control unit, and an engine operation control unit that, in the case where the inter-vehicle distance control unit is set to be active in the vehicle stop state, maintains the operation state of the engine before the inter-vehicle distance control unit is set to be active.

A second aspect of the invention relates to an engine control method for a control apparatus for a vehicle. The control apparatus includes: an inter-vehicle distance control unit that, if set to be active, performs an inter-vehicle distance control in which the vehicle travels by following a preceding vehicle with an inter-vehicle distance corresponding to the vehicle speed while the preceding vehicle is captured, and travels at a preset constant vehicle speed while the preceding vehicle is not captured; an engine stop-start unit that stops the engine when an engine stop condition is satisfied and starts the engine when an engine start condition is satisfied; and a vehicle stop state maintenance unit that provides a braking force for maintaining the vehicle in the vehicle stop state, wherein the engine stop-start unit stops the engine, by activation of the vehicle stop state maintenance unit in the case where the vehicle is stopped by the inter-vehicle distance control unit. The engine control method includes: a step in which an engine operation control unit, in the case where the inter-vehicle distance control unit is set to be active in the vehicle stop state, maintains the operation state of the engine before the inter-vehicle distance control unit is set to be active.

According to above aspects of the invention, it is possible to provide a control apparatus for a vehicle that is capable of appropriately controlling the inter-vehicle distance control function, the vehicle stop maintenance function and the idle-stop function without making the user feel uncomfortable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B are exemplary flowcharts showing the operation procedure of the BH control part;

FIGS. 9A and 9B are exemplary flowcharts showing the operation procedure of the S&S control part in the case where the inter-vehicle distance control function is not set (modified example 3).

DETAILED DESCRIPTION OF EMBODIMENTS

Figure 1:
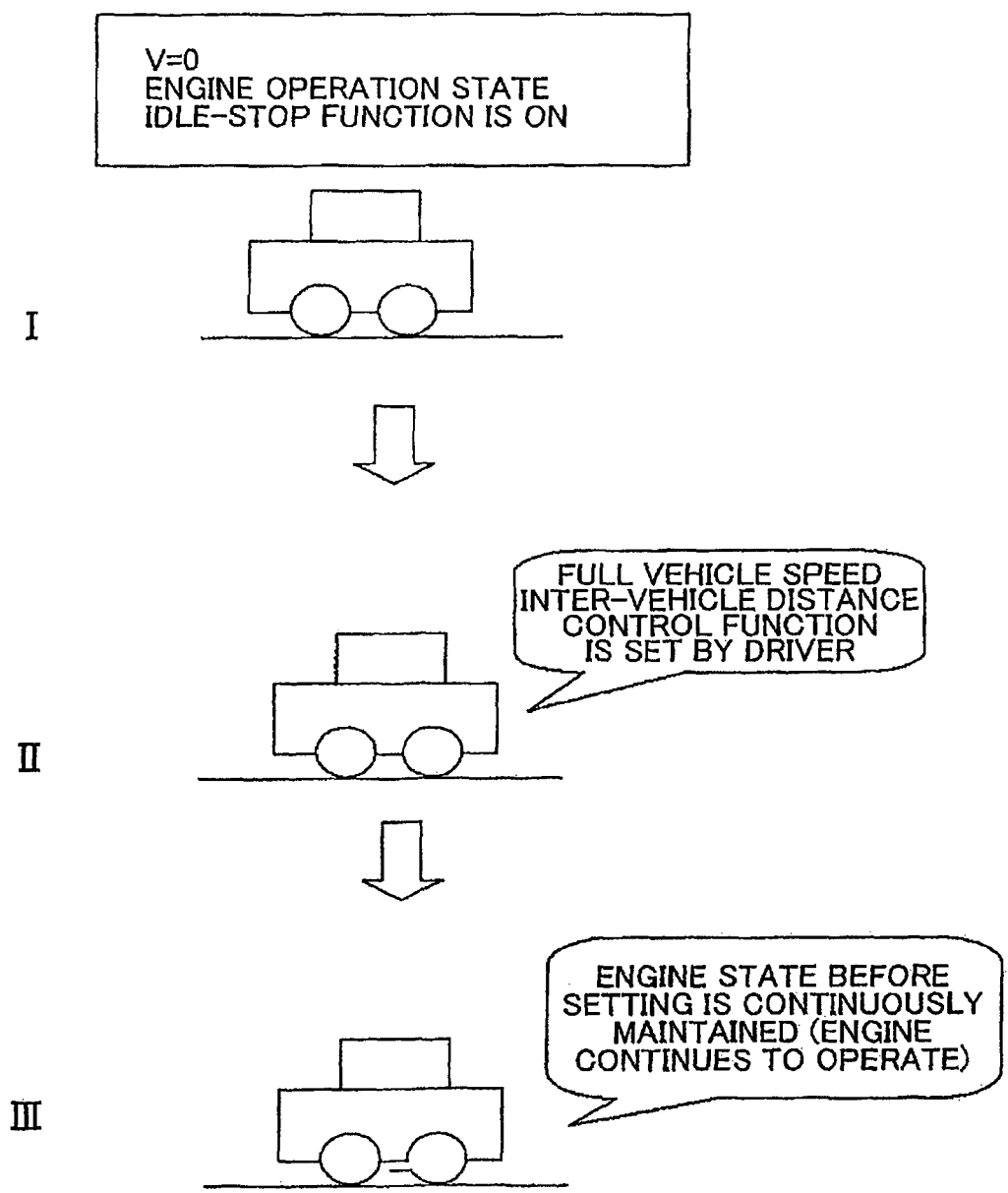
FIG. 1 is an exemplary diagram for explaining an outline of the operation procedure of the control apparatus for a vehicle.

Hereinafter, the modes for carrying out the present invention will be described with reference to the attached figures. [Outline of operations] FIG. 1 is an exemplary diagram for explaining an outline of the operation procedure of the control apparatus for a vehicle. I. The vehicle is stopped in a state where the engine is operated and in a state where the idle-stop function is ON. II. The driver operates an ACC switch to set the full vehicle speed range inter-vehicle distance control function. III. In this case (in the case where the full vehicle speed range inter-vehicle distance control function is set in the vehicle stop state), the control apparatus for a vehicle according to the present embodiment continues to maintain the operation state of the engine before the full vehicle speed range inter-vehicle distance control function is set.

With such control, in the case where the full vehicle speed range inter-vehicle distance control function is set in the vehicle stop state, if the engine is being operated, the idle-stop function will make the engine to continue operation; even if an engine stop condition is satisfied. Therefore, it is possible to reduce the possibility that the driver mistakenly thinks of the stop of the engine. In addition, in this case, if a preceding vehicle is started, a following traveling is started by the full vehicle speed range inter-vehicle distance control function.

In addition, in I and II, in the case where the engine is in stop state during the vehicle stop, when the full vehicle speed range inter-vehicle distance control function is set, the idle-stop function will maintain the engine stop state. In this case, if the preceding vehicle is started, the engine is started by the idle-stop function.

Therefore, the state of the engine before the full vehicle speed inter-vehicle distance control function is set is continuously maintained regardless of whether or not the engine is stopped, and after that, it is possible to utilize the normal full vehicle speed inter-vehicle distance control function, idle-stop function and vehicle stop maintenance function.

Hereinafter, terms used in the present embodiment are defined. The vehicle stop maintenance function is made active by a predetermined switch, the situation where the vehicle stop maintenance function that has been made active maintains the stop state of the vehicle by generating a braking force is called ON or activated, and the situation where the stop state of the vehicle is released is called OFF or released. In addition, it is assumed that the vehicle stop maintenance function always remains active in the present embodiment.

The idle-stop function is made active by an energy saving traveling SW (described later). The situation where the idle-stop function is activated includes the situation where the engine is stopped and the situation where the engine is started.

The full vehicle speed range inter-vehicle distance control function is made ON by an ACC switch (described later). In principle, the full vehicle speed range inter-vehicle distance control function is made active by turning on the ACC switch, however, depending on the vehicle speed, sometimes the full vehicle speed range inter-vehicle distance control function is made active if the ACC switch is turned on and a predetermined condition is satisfied. In the present embodiment, the situation where the full vehicle speed range inter-vehicle distance control function is made active is called "set", and the situation where the full vehicle speed range inter-vehicle distance control function is made inactive is called "canceled". In addition, hereinafter the full vehicle speed range inter-vehicle distance control function is simply referred to as "inter-vehicle distance control function".

Figure 2:
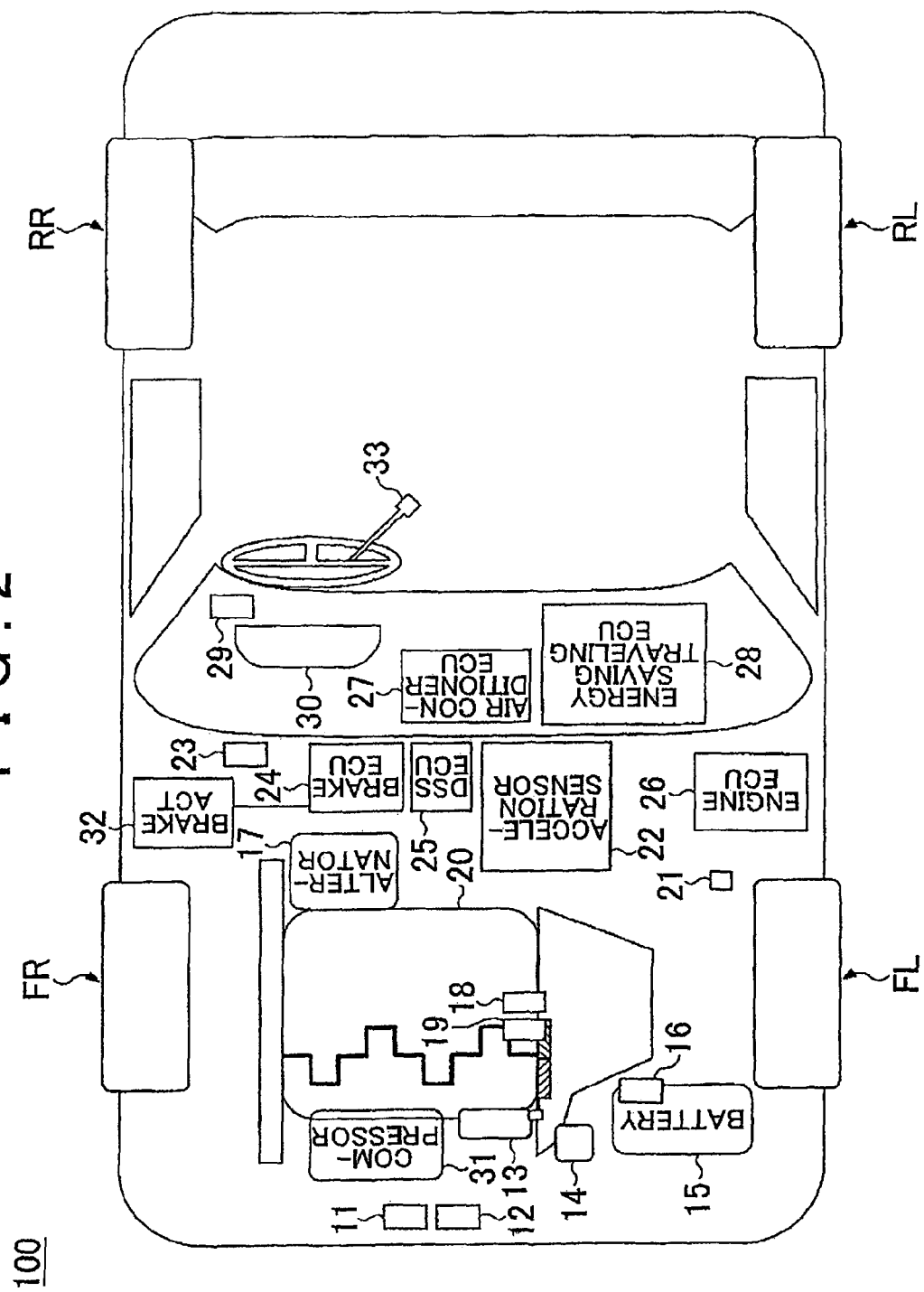
FIG. 2 is an exemplary block diagram of the units functions of the control apparatus for a vehicle.

[Structural example] FIG. 2 is an exemplary block diagram of the units • functions of the control apparatus 100 for a vehicle according to the present embodiment. These units • functions are not necessarily all used for the idle-stop function, the vehicle stop maintenance function, and the inter-vehicle distance control function. In addition, the arrangement site and/or shape are only schematic representation. In addition, ECUs and/or sensors are connected so as to be capable of communicating via onboard networks such as CAN (Controller Area Network), or via dedicated lines.

The battery 15 is a power storage device (secondary battery) capable of charging and discharging. The battery 15 is, for example, a lead battery, which supplies power to an electric oil pump 14, a brake hydraulic pump (not shown), a series-connected starter 13, and various ECUs (Electronic Control Units). In addition, the battery 15 is charged by the power generated by an alternator 17. The SOC of the battery 15 is monitored by a battery sensor 16.

The engine 20 is equipped with the electric oil pump 14, the series-connected starter 13, a compressor 31 for an air conditioner, the alternator 17, a cam angle sensor 18, and a crank angle sensor 19. The series-connected starter 13 starts the engine 20 by consuming the power from the battery 15. In the case where the engine rotation speed is high, the series-connected starter 13 pushes out a pinion after bringing it into rotation to make it engage with a ring gear, such that the engine 20 can be started even during rotation of the engine. Also, a starter not having the function to rotate the pinion may be equipped.

The alternator 17 is a power generator which generates power by being rotated in association with rotation of the crankshaft. A transmission belt is wound around the crankshaft and the rotation shaft of the alternator 17, and the alternator 17 is rotated by the power of the engine 20. The power generated by the alternator 17 is charged into the battery 15.

In addition, a transmission belt is wound around the compressor 31 of the air conditioner and the crankshaft, and the compressor 31 is rotated by the power of the engine 20.

The electric oil pump 14 is driven by the battery 15, and circulates the engine oil when the engine is stopped, whereby biased accumulation of the engine oil during the stop of the engine is prevented, and the engine 20 is cooled during the stop of the engine.

The crank angle sensor 19 detects the crank angle and the cam angle sensor 18 detects the cam angle. By identifying the crank angle and the cam angle, the so-called cylinder determination can be performed. For example, since the timing at which the respective cylinders arrive at the top-dead point is known, the cylinder in which fuel is injected and combusted can be determined upon start of the engine. In addition, the crank angle sensor 19 is used to detect the engine rotation speed.

An engine hood lock SW12 and a distance sensor 11 are mounted in the front of the vehicle. The engine hood lock SW12 is a sensor to detect whether or not the engine hood is locked. When the hood is opened, start of the engine is prohibited by the idle-stop function because the driver cannot recognize the front.

The distance sensor 11 is, for example, a millimeter wave radar, a laser radar, a stereo camera, a TOF (Time of Flight) camera, or the like, and is a sensor to detect the distance to an object. Besides the distance, relative speed and orientation can also be obtained therefrom. The inter-vehicle distance control function makes the host vehicle to follow the preceding vehicle by maintaining a distance corresponding to the vehicle speed of the host vehicle.

The engine ECU 26 is an ECU for controlling the engine 20, and is connected with a series-connected starter driving relay 21. If the engine ECU 26 energizes the series-connected starter driving relay 21, the series-connected starter 13 operates to start the engine 20.

The brake ECU 24 controls wheel cylinder pressure of the respective wheels by controlling the brake ACT 32. The brake ACT 32 includes an electric pump (not shown) for generating a hydraulic pressure, and also includes a pressure increasing valve, a pressure reducing valve and a holding valve for each wheel. By controlling the opening degree of the pressure increasing valve, the pressure reducing valve and the holding valve, increase, reduction, and hold of wheel cylinder pressure for the respective wheels can be performed. The brake ECU 24 maintains the vehicle stop state by these functions. In addition, the VSC (Vehicle Stability Control), ABS control, TRC control, and so on, can also be performed. Moreover, in the VCS control, the wheel cylinder pressure of the respective wheels is controlled so as to prevent unstable vehicle behaviors, such as excessive under-steering and over-steering of the host vehicle. In addition, the brake ECU 24 and the brake ACT 32 may be configured to supply hydraulic pressure accumulated in an accumulator or the like to the respective wheel cylinders according to the depression force on the brake pedal by the driver, so as to brake the respective wheels.

The brake booster negative pressure sensor 23 is a sensor to detect a booster negative pressure generated by the negative pressure of the intake air of the engine 20. By using this negative pressure, the depression force on the brake pedal by the driver can be boosted, so that the brake pedal can be reliably depressed by the driver. If the booster negative pressure becomes larger (approximate to the atmospheric pressure), the idle-stop function will start the engine 20 to reduce the booster negative pressure, so as to prepare for the driver's operation of the brake pedal.

The acceleration sensor 22 is a sensor to detect the acceleration in fore-aft direction or in right-left direction, and is used to calculate the inclination angle (slope) of the road surface on which the vehicle is stopped. The braking force for keeping the vehicle stop state is corrected according to the slope.

The air conditioner ECU 27 performs the so-called air conditioning control that controls the temperature inside the cabin to be a temperature set by the driver. In the case where the engine has been stopped by the idle-stop function, since the compressor 31 of the air conditioner is stopped, the air conditioner is switched to air blowing function. In addition, during the air conditioning control performed by the air conditioner ECU 27 in the state where the difference between the set temperature and the target temperature is large, the idle-stop function does not stop the engine 20.

The energy saving traveling ECU 28 is an ECU to control the idle-stop function. In the energy saving traveling ECU 28, a function to boost the voltage of the battery is integrated. When the engine 20 is started by the idle-stop function, since the voltage of the battery is lowered by the driving of the series-connected starter 13, the energy saving traveling ECU 28 boosts the voltage of the battery in order to ensure the required voltage for other auxiliaries (ECUs, in-cabin lights, and so on).

The energy saving traveling canceling SW29 is a switch for turning off the idle-stop function. If the driver operates the energy saving traveling canceling SW29 to be ON, the idle-stop function is turned off.

The DSS (Driver Support)_ECU 25 is an ECU for performing inter-vehicle distance control. That is, when a preceding vehicle is detected, the following traveling is performed in such a manner that the distance to the preceding vehicle becomes a target inter-vehicle distance corresponding to the vehicle speed. In the case where no preceding vehicle is detected, a constant-speed traveling is performed at a vehicle speed set by the driver. In addition, when the preceding vehicle is stopped, the host vehicle is also stopped while maintaining a suitable inter-vehicle distance. In the case where the preceding vehicle is resumed to travel, on the one hand, an inter-vehicle distance corresponding to the vehicle speed is maintained, and on the other hand, the following travelling begins.

The ACC switch 33 is provided by extending from a steering column. The ACC switch 33 receives and handles the user's turning ON/OFF (setting/non-setting) of the inter-vehicle distance function, setting of a constant vehicle speed absent the preceding vehicle, increase or reduction of the constant vehicle speed, and resumption of the inter-vehicle distance control function after it is canceled, and so on.

In addition, various operation conditions and/or alarm messages of the inter-vehicle distance control function, the vehicle stop maintenance function, and the idle-stop function are displayed on a dashboard 30, and a warning light is turned on. In addition to the dashboard 30, alarm messages and/or alarm sound can also be output from a speaker.

Figure 3:
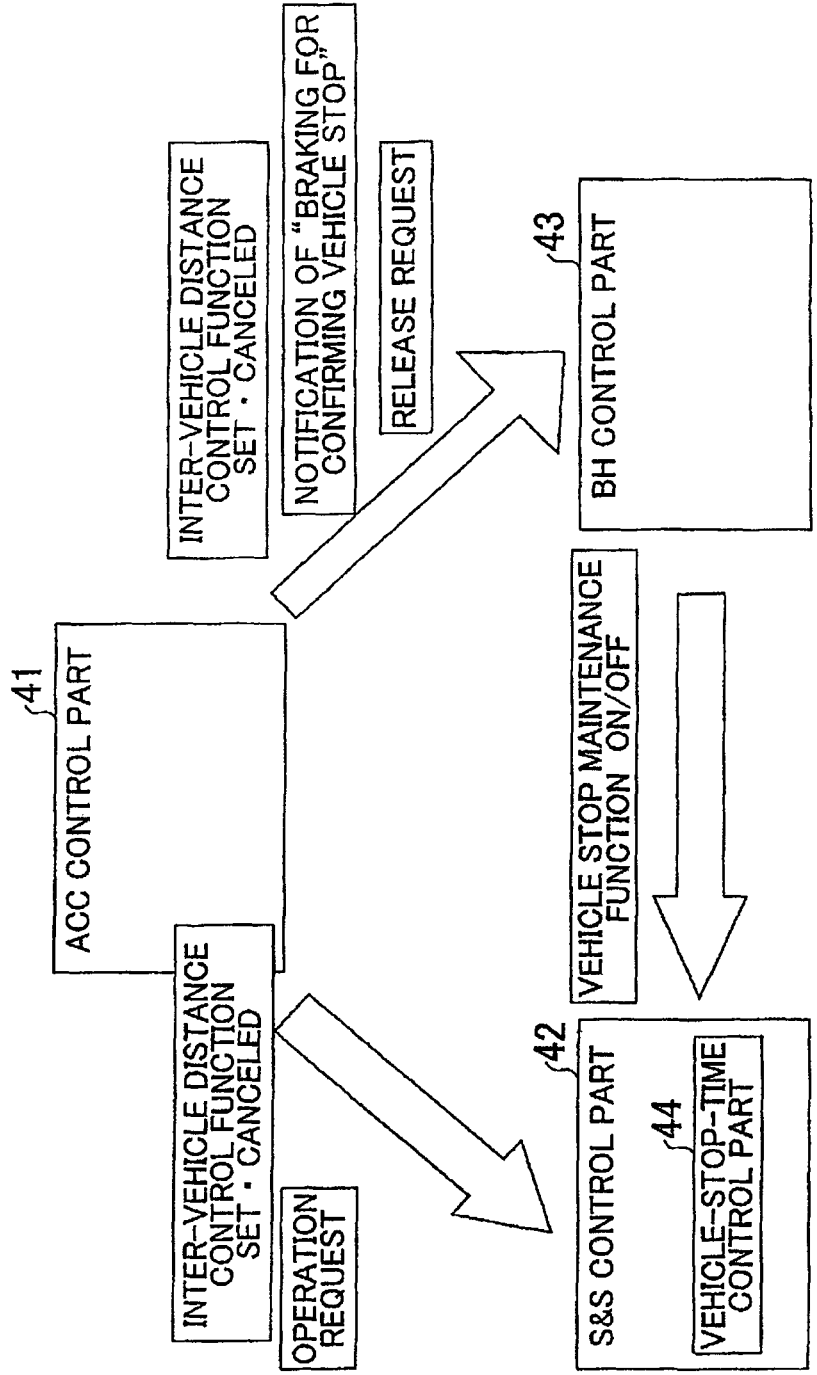
FIG. 3 is an exemplary functional block diagram of the ACC control part, the S&S control part and the BH control part included in the control apparatus for a vehicle.

[Inter-vehicle distance control function, vehicle stop maintenance function, idle-stop function] FIG. 3 is an exemplary functional block diagram showing the ACC control part 41, the S&S control part 42 and the BH control part 43 included in the control apparatus for a vehicle 100. These functions are implemented by CPUs of the respective ECUs executing programs stored in the ROM and in cooperation with various hardware.

The ACC control part 41 is a function implemented mainly by the DSS_ECU, the engine ECU, the brake ECU, and so on. The S&S control part 42 is a function implemented mainly by the energy saving traveling ECU 28, and the BH control part 43 is a function implemented mainly by the brake ECU. However, it can be set as appropriate on which ECUs the respective functions are mounted. In addition, these functions may be mounted on a single ECU. That is, it will suffice as long as these functions are included in the vehicle.

The ACC control part 41, the S&S control part 42 and the BH control part 43 transmit and receive various kinds of data by the ECUs' communication with one another via an onboard network (CAN, FlexRay, LIN, Ethernet (registered trademark), MOST, and so on).

<Vehicle stop maintenance function> The BH control part 43 is a control part for controlling the vehicle stop maintenance function. The BH control part 43 determines whether or not there is a vehicle stop maintenance activation operation when the vehicle is stopped, and if yes, it turns on the vehicle stop maintenance function. The maintenance of vehicle stop state is done by making the wheel cylinders generate hydraulic pressure using the brake ACT 32. In addition, the BH control part 43 can switch to electronic park braking when a predetermined period of time (for example, several minutes) has lapsed after the vehicle stop maintenance function is turned on, so as to continue the braking hold.

The braking force for maintaining the vehicle stop state is a braking force for maintaining the vehicle in the stop state during idle operation of the engine 20. The BH control part 43 controls the brake ACT 32 by means of a required dynamic pressure which is calculated according to the idle speed of the engine 20 etc. and corrected by the inclination of the road etc.

In addition, when a vehicle stop maintenance release operation for turning off the vehicle stop maintenance function is detected, the BH control part 43 releases the maintenance of the vehicle stop state.

The vehicle stop maintenance activation operation and the vehicle stop maintenance release operation will be described. The vehicle stop maintenance activation operation and the vehicle stop maintenance release operation vary depending on whether or not the inter-vehicle distance control function is set. <<The inter-vehicle distance control function is not set>> the vehicle stop maintenance activation operation includes an operation of the driver to depress the brake pedal with a depression force larger than a threshold, an operation that a predetermined button is pushed, or the like; and the vehicle stop maintenance release operation includes an operation that the accelerator pedal is depressed. <<The inter-vehicle distance control function is set>> the vehicle stop maintenance activation operation includes a notification of "braking for confirming the vehicle stop" from the ACC control part; and the vehicle stop maintenance release operation includes a release request from the ACC control part (including a situation based on the start of the preceding vehicle and a situation based on the resumption operation of the ACC switch 33).

<Inter-vehicle distance control function> Next, the ACC control part 41 will be described. The ACC control part 41 is a control part for controlling the inter-vehicle distance control function. The ACC control part 41 calculates a target acceleration (required driving force) based on the object information (relative distance, relative speed and orientation) about an object detected by the distance sensor 11 and the current speed and acceleration of the host vehicle detected by a wheel speed sensor (not shown) etc., and sends the target acceleration to the engine ECU 26 and/or the brake ECU 24. The target acceleration is a positive or negative value. If it is positive, the engine ECU 26 performed an acceleration control, and if it is negative and is a target acceleration that requires braking, the brake ECU 24 controls the brake ACT 32 to decelerate. The method for calculating the target acceleration is well-known and thus is omitted here.

The engine ECU 26 determines a throttle opening degree according to the target acceleration, and controls a throttle motor to control the throttle opening degree to one by which the target acceleration can be obtained: In addition, with reference to a map for setting the vehicle speed and the throttle opening degree, the transmission is controlled as needed to change the gear range.

The brake ECU 24 controls the opening/closing and opening degree of the holding valve, the pressure increasing valve and the pressure reducing valve of the brake ACT 32 according to the target acceleration (negative value), so as to control the wheel cylinder pressure.

In addition, in the case where the vehicle is stopped by the brake ECU 24, considering there is a possibility that the vehicle has not been stopped, the ACC control part 41 increases the wheel cylinder pressure to fully stop the vehicle. Such braking is called "braking for confirming vehicle stop". In the case where the inter-vehicle distance control function has been set, it can be assumed that the driver does not operate the brake pedal, therefore, as above described, the "braking for confirming vehicle stop"

becomes the vehicle stop maintenance activation operation of the BH control part 43 for turning on the vehicle stop maintenance function.

<<Supplement to setting of inter-vehicle distance control function>> In the foregoing, it has been described that depending on the vehicle, the inter-vehicle distance control function is set in the case where the ACC switch 33 is turned on and a predetermined condition is satisfied. The predetermined condition (limited to vehicle stop state) is, for example, the shift lever being in the D gear and a preceding vehicle being captured. This is because the inter-vehicle distance control function is a function with which the vehicle will travel following the preceding vehicle even if the driver does not operate the accelerator pedal. Therefore, if the state where it is possible to start the vehicle is not taken as a condition, it would be meaningless to set the inter-vehicle distance control function. In other word, if there is not a situation where it is possible to start the host vehicle by following the preceding vehicle, the problem of the present application (the engine will be stopped when the inter-vehicle distance control function is set) would not occur. Therefore, by limiting the condition for setting the inter-vehicle distance control function to "start by following is possible", it is possible to reduce the situations where the problem of the present application occurs.

<Idle-stop function> Next, the S&S control part 42 will be described. The S&S control part 42 is a control part for controlling the idle-stop function. The S&S control part 42 determines whether or not an engine stop condition is satisfied, and if yes, stops the engine 20; and determines whether or not an engine start condition is satisfied in the case the engine 20 has been stopped, and if yes, starts the engine 20.

The engine stop condition varies according to whether or not the inter-vehicle distance control function is set. Firstly, the conventional engine stop condition will be described. In addition, the engine stop condition is an AND condition, and the engine operation condition is an OR condition. The engine stop condition (in the case where the inter-vehicle distance control function is not set) includes: the vehicle speed being zero or not above a predetermined value, and the brake pedal being depressed. The engine stop condition (in the case where the inter-vehicle distance control function is set) includes: the vehicle speed being zero or not above a predetermined value, and the vehicle stop maintenance function being ON. However, as a stop prohibition condition, there are the air conditioner ECU prohibiting the stop of the engine, the SOC of the battery 15 being a threshold or below, electric load being a threshold or above, the temperature of coolant of the engine being a threshold or below, and the accelerator pedal being depressed, and so on.

That is, in the case where the inter-vehicle distance control function is set, sometimes the driver does not operate the brake pedal, therefore, the S&S control part 42 stops the engine 20 by turning on the vehicle stop maintenance function.

The engine start condition varies according to setting/non-setting of the inter-vehicle distance control function, and ON/OFF of the vehicle stop maintenance function. The engine start condition (in the case where the inter-vehicle distance control function is not set and the vehicle stop maintenance function is OFF) includes: release of the brake pedal from depression being detected, the accelerator pedal being depressed, the SOC of the battery 15 being lowered to a threshold, or below, and the negative pressure of the brake booster becoming a threshold or above. The engine start condition (in the case where the inter-vehicle distance control function is not set and the vehicle stop maintenance function is ON) includes: the accelerator pedal being depressed, the SOC of the battery 15 being lowered to a threshold or below, and the negative pressure of the brake booster becoming a threshold or above. The engine start condition (in the case where the inter-vehicle distance control function is set and the vehicle stop maintenance function is ON) includes: operation request from the ACC control part 41, the SOC of the battery 15 being lowered to a threshold or below, the negative pressure of the brake booster becoming a threshold or above. However, as a start prohibition condition, there is "the engine hood lock SW 12 being disconnected", and so on. In addition, when the inter-vehicle distance control function is set, the vehicle stop maintenance function will become active automatically to be turned on in the vehicle stop state. Therefore, there is not the combination of the inter-vehicle distance control function being set and the vehicle stop maintenance function being OFF.

That is, in the case where the inter-vehicle distance control function is not set and the vehicle stop maintenance function is ON, release of the brake pedal from depression being detected is no longer an engine start condition (mainly the accelerator pedal being depressed becomes the condition), so that the S&S control part 42 will not operate the engine 20 even if the driver moves his foot away from the brake pedal. In addition, in the case where the inter-vehicle distance control function is set and the vehicle stop maintenance function is ON, the vehicle will be started by following the preceding vehicle even if the driver does not operate the accelerator pedal, therefore, the engine 20 is operated by the operation request from the ACC control part 41.

In order to realize the above cooperation among the BH control part 43, the S&S control part 42 and the ACC control part 41, the BH control part 43 outputs the ON/OFF of the vehicle stop maintenance function to the S&S control part 42. In addition, the ACC control part 41 outputs the setting/non-setting of the inter-vehicle distance control function and the operation request for the engine 20 to the S&S control part 42. In addition, the ACC control part 41 outputs to the BH control part 43 the setting/non-setting of the inter-vehicle distance control function, the notification of "braking for confirming vehicle stop" and the release request for the vehicle stop maintenance function. In addition, it will suffice that these information can be obtained by communication among the BH control part 43, the S&S control part 42 and the ACC control part 41, and it does not matter how the BH control part 43, the S&S control part 42 and the ACC control part 41 transmit the information, as long as it is suitable for the design of the network, and so on.

<Characterizing part of the S&S control part in the present embodiment> The S&S control part 42 includes a vehicle-stop-time control part 44. The vehicle-stop-time control part 44 changes the above-mentioned conventional "engine stop condition (the inter-vehicle distance control function is set)" as follows. The engine stop condition (the inter-vehicle distance control function is set) includes: 1. the vehicle speed being zero or being a predetermined value or below; 2. the vehicle stop maintenance function being ON; and 3. nevertheless, even if the conditions 1 and 2 are satisfied, in the case where the inter-vehicle distance control function is set in the vehicle stop state, the state of the engine 20 before the inter-vehicle distance control function is set is continuously maintained.

By setting the inter-vehicle distance control function during the operation of the engine in the vehicle stop state, even if the conditions 1 and 2 are satisfied, the engine 20 is prevented, from being stopped by the prohibition rule in 3.

Figure 4:
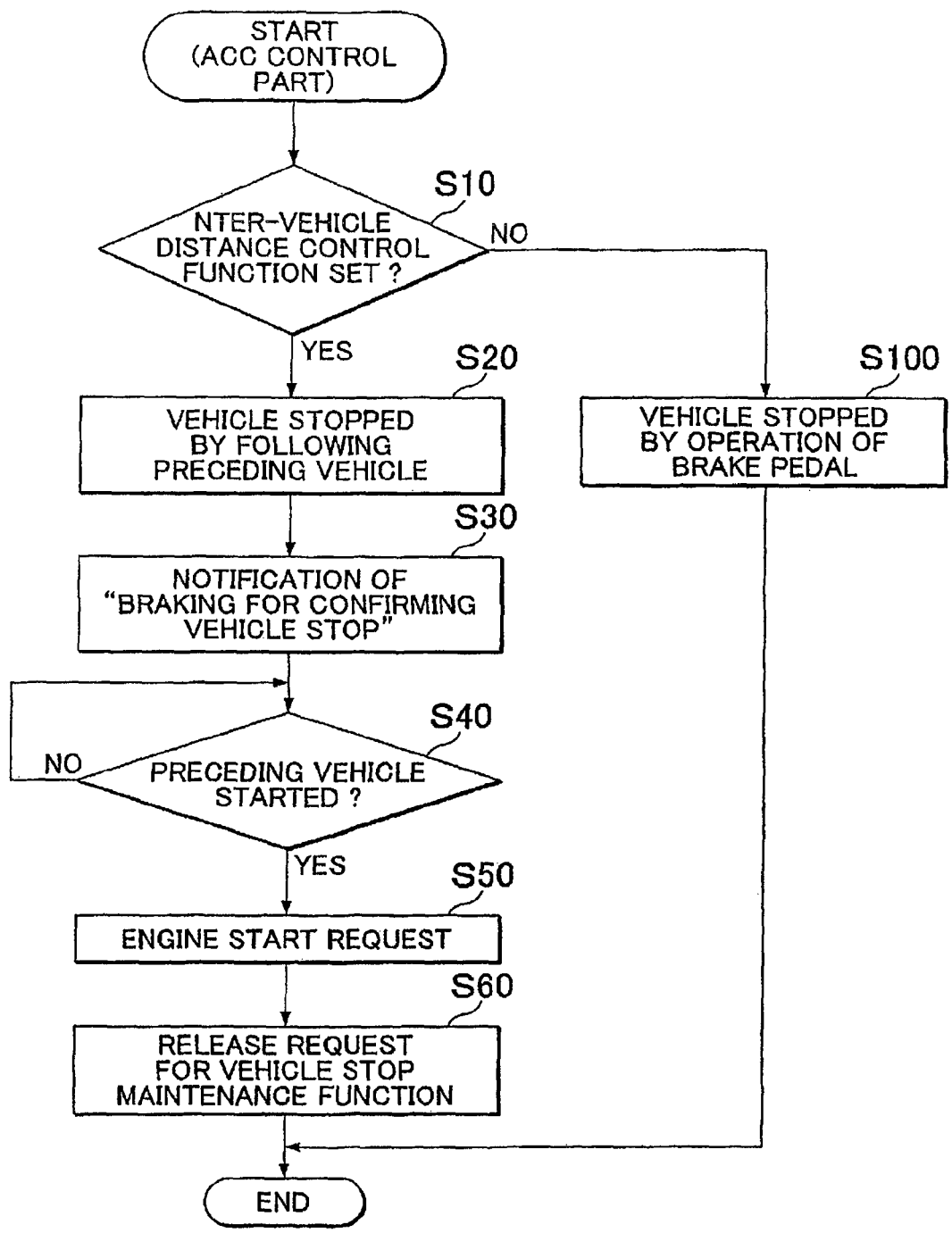
FIG. 4 is an exemplary flowchart showing the operation procedure of the ACC control part.

[Operation procedure] FIG. 4 is an exemplary flowchart showing the operation procedure of the ACC control part 41.

The ACC control part 41 determines whether or not the inter-vehicle distance control function is set (S10).

In the case where the inter-vehicle distance control function is not set (NO in S10), the driver accelerates or decelerates the vehicle by operating the accelerator pedal, and stops the vehicle by operating the brake pedal when the preceding vehicle is stopped or when the vehicle is waiting for the traffic lights, and so on (S100).

In the case where the inter-vehicle distance control function is set (YES in S10), the ACC control part 41 performs a travel following the preceding vehicle, and stops the vehicle when the preceding vehicle is stopped (S20).

When the vehicle speed becomes a value that may be taken as zero, the ACC control part 41 performs the "braking for confirming vehicle stop" in order to confirm that the vehicle is stopped, and sends the notification of "braking for confirming vehicle stop" to the BH control part 43 (S30). Thus, the BH control part 43 turns on the vehicle stop maintenance function. In the case where an engine stop condition other than "BH being ON" is satisfied, the S&S control part 42 stops the engine 20.

The ACC control part 41 determines whether or not the preceding vehicle is started based on the distance information with respect to the preceding vehicle detected by the distance sensor 11 (S40).

In the case the preceding vehicle is started (YES in S40), the ACC control part 41 outputs an engine start request to the S&S control part 42 (S50). If the engine 20 is not stopped, the engine start request may also not be output.

Next, the ACC control part 41 outputs a release request for the vehicle stop maintenance function (S60). Thus, the 13H control part 43 turns off the vehicle stop maintenance function.

In addition, in the procedure of FIG. 4, the vehicle stop maintenance function is released by the start of the preceding vehicle, however, the release can also be released by the driver's operation. The operation is, for example, the above-mentioned "resumption operation of the ACC switch". By releasing the vehicle stop maintenance function after the driver's start operation is detected, it is possible to suppress the situation where the vehicle is started when it has not been well-prepared therefore.

Figure 5A:
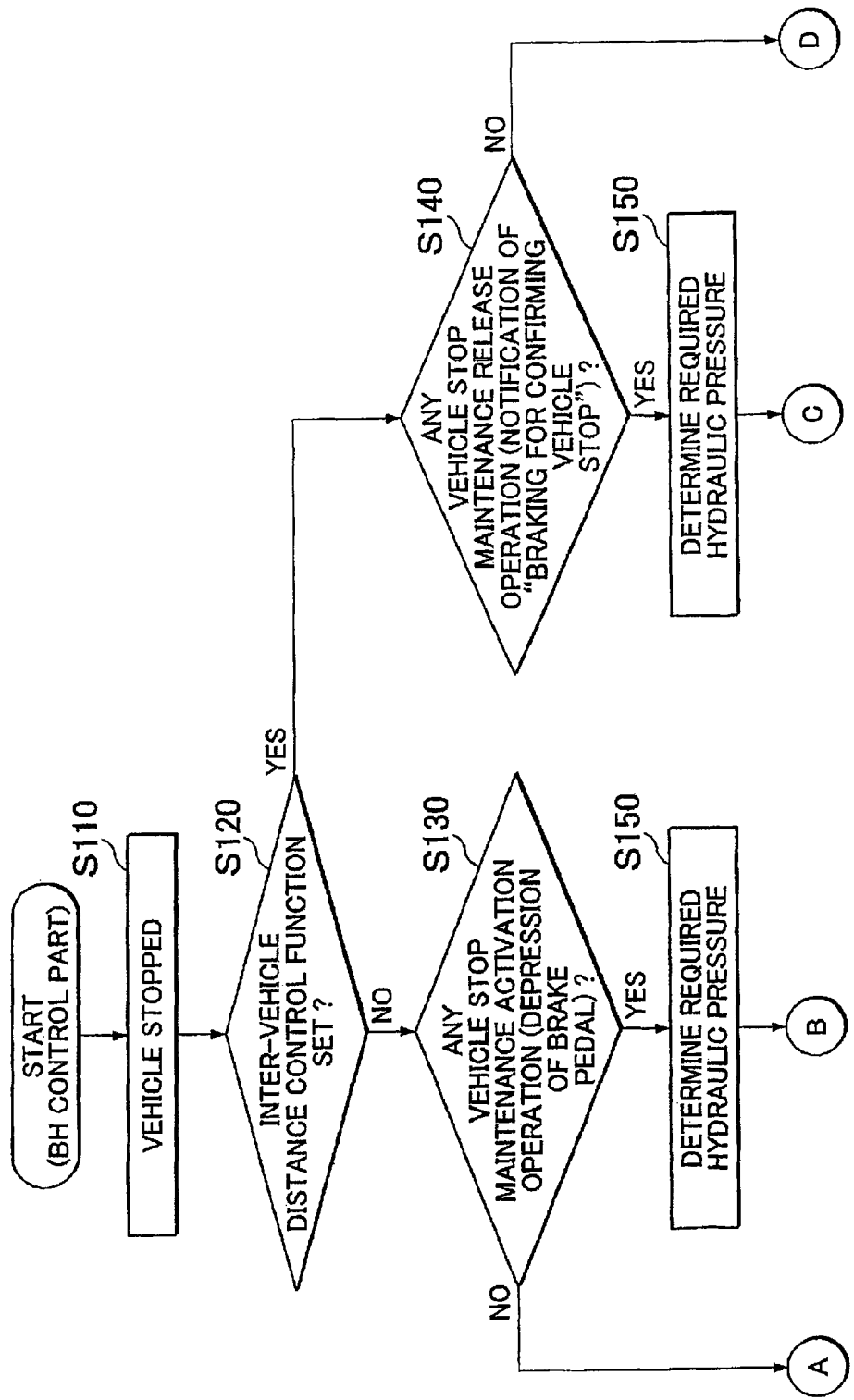

FIGS. 5A and 5B are exemplary flowcharts showing the operation procedure of the BH control part 43. The vehicle is stopped by the driver's operation of the brake pedal or by following the preceding vehicle through the ACC control part 41 (S110).

When the vehicle is stopped (when the vehicle speed is zero), the BH control part 43 determines whether or not the inter-vehicle distance control function is set (S120).

In the case where the inter-vehicle distance control function is not set (NO in S120), the ACC control part 41 is not active, thus, the BH control part 43 determines whether or not there is a vehicle stop maintenance activation operation (depression of the brake pedal) (S130).

On the other hand, in the case where the inter-vehicle distance control function is set (YES in S120), the ACC control part 41 is active, thus, the BH control part 43 determines whether or not there is a vehicle stop maintenance activation operation (the notification of "braking for confirming vehicle stop") (S140).

In the case where the determination result in S130 or in S140 is YES, the S&S control part 42 stops the engine if the stop prohibition condition is not satisfied.

In the case where the determination result in S130 or S140 is YES, the BH control part 43 determines the wheel cylinder pressure required for maintaining the vehicle stop (S150). When the vehicle is stopped in D gear, the engine may be in the operation state or in the stop state. The wheel cylinder pressure is, for example, such a wheel cylinder pressure with which the vehicle would not move by the driving force of the engine in idle state or the driving force of the engine when it is started. The wheel cylinder pressure can either be calculated by equations or retained beforehand as a fixed value. In addition, the BH control part 43 corrects the wheel cylinder pressure according to the inclination angle of the road surface.

Next, the BH control part 43 turns on the vehicle stop maintenance function (S160). That is, the vehicle stop state is maintained by requesting the brake ACT 32 to maintain the determined wheel cylinder pressure. Since the driver can move his foot away from the brake pedal, the degree of freedom for the driver's posture is improved in the case of vehicle stop for a short time, etc.

Next, the BH control part 43 outputs "the vehicle stop maintenance function being ON" to the S&S control part 42 (S170). Thus, even in the case where the driver does not depress the brake pedal, the S&S control part 42 can stop the engine 20.

In addition, in the procedure of FIGS. 5A and 5B, regardless of whether or not the inter-vehicle distance control function is set, the controls in the steps S150 to S170 are set to be the same, however they may be varied according to whether or not the inter-vehicle distance control function is set.

The vehicle stop maintenance release condition varies depending on whether or not the inter-vehicle distance control function is set. In the case where the inter-vehicle distance control function is not set, the BH control part 43 determines whether or not the accelerator pedal is operated (S180). This is because the vehicle should be started by the driver's operation in the case where the inter-vehicle distance control function is not set.

In the case where the inter-vehicle distance control function is set, the BH control part 43 determines whether or not a release request for the vehicle stop maintenance function is output (S190). It is possible to prevent the vehicle being started by the driver's misoperation to depress the accelerator pedal in the case where the inter-vehicle distance control function is set. However, it may also not be designed in such a safe way, and the vehicle stop maintenance function may be released by depressing the accelerator pedal. Thereby the vehicle can be started as desired by the driver.

When the determination result in any of S180 and S190 is YES, the BH control part 43 turns off the vehicle stop maintenance function (S200). That is, the BH control part 43 allows the vehicle to start by reducing the wheel cylinder pressure.

The BH control part 43 outputs the OFF of the vehicle stop maintenance function to the S&S control part 42 (S210), and may also output the OFF of the vehicle stop maintenance function to the ACC control part 41. The ACC control part 41 can detect that the vehicle may be started.

Next, the S&S control part 42 will be described. Since the operation of the S&S control part 42 varies depending on whether or not the inter-vehicle distance control function is set, the operation procedure in each case will be described.

In the case where the inter-vehicle distance control function is set, the engine stop condition is "the vehicle is stopped and the vehicle stop maintenance function is ON".

Figure 6A:
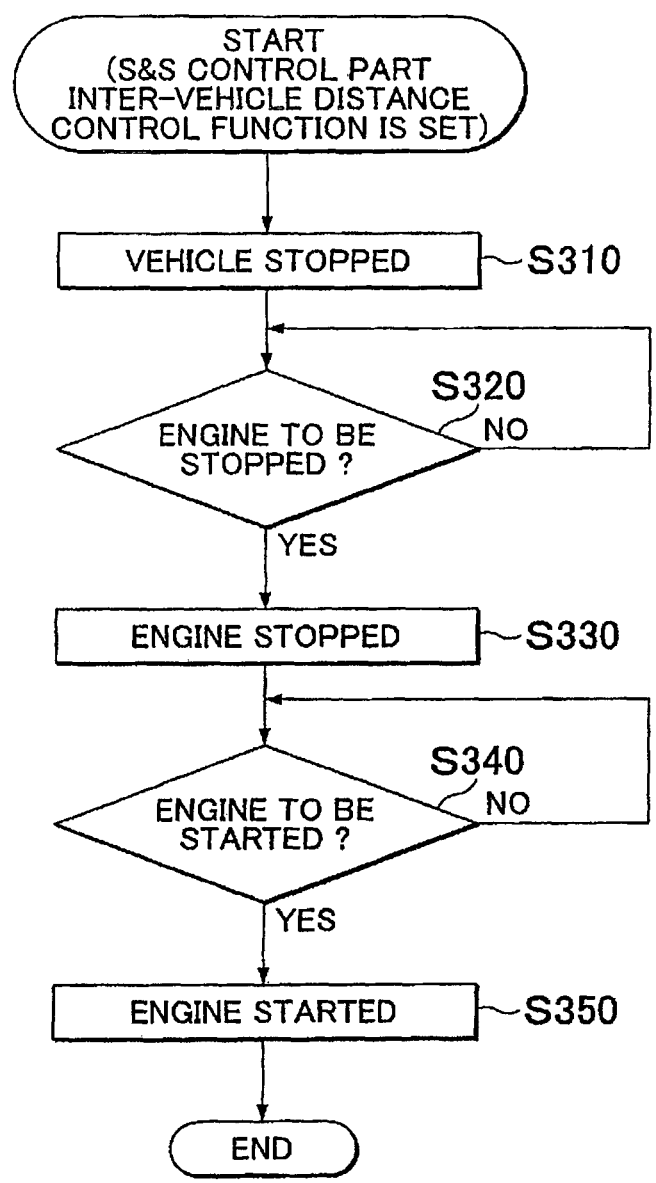
FIG. 6A is an exemplary flowchart showing, the operation procedure of the S&S control part in the case where the inter-vehicle distance control function is set.

FIG. 6A is an exemplary flowchart showing the operation procedure of the S&S control part 42 in the case where the inter-vehicle distance control function is set.

In the case where the inter-vehicle distance control function is set, the ACC control part 41 stops the vehicle by following the preceding vehicle (S310). In addition, the vehicle stop in the sense of the idle-stop function generally means the vehicle speed becomes zero, however there is also an S&S which will stop the engine 20 even if the vehicle speed is above zero but below a predetermined value. In the present embodiment, for the purpose of illustration, it is determined that the vehicle is stopped if the vehicle speed becomes zero.

When the vehicle is stopped, the S&S control part 42 determines whether or not to stop the engine 20 based on the engine stop condition (S320). In addition, the stop prohibition condition being not satisfied is taken as a condition. In the case where the inter-vehicle distance control function is set, since the driver does not operate the brake pedal, it is determined whether or not the ON of the inter-vehicle distance control function is received.

In the case where the engine stop condition is satisfied (YES in S320), the S&S control part 42 requests the engine ECU 26 to stop the engine, and the engine ECU 26 stops the engine 20 by stopping the fuel injection (S330).

In the case where the engine 20 is stopped, the S&S control part 42 determines whether or not to start the engine based on the engine start condition (S340). In the case where the inter-vehicle distance control function is set, the engine start condition is an engine start request being obtained from the ACC control part 41. In addition, in the case where the start prohibition condition is satisfied, the engine 20 will not be started.

In the case where the engine start condition is satisfied and the start prohibition condition is not satisfied, the S&S control part 42 starts the engine 20 (S350). That is, the control part 42 requests the engine ECU 26 to start the engine. Therefore, the engine ECU 26 turns on the series-connected starter driving relay to start the engine 20.

Figure 6B:
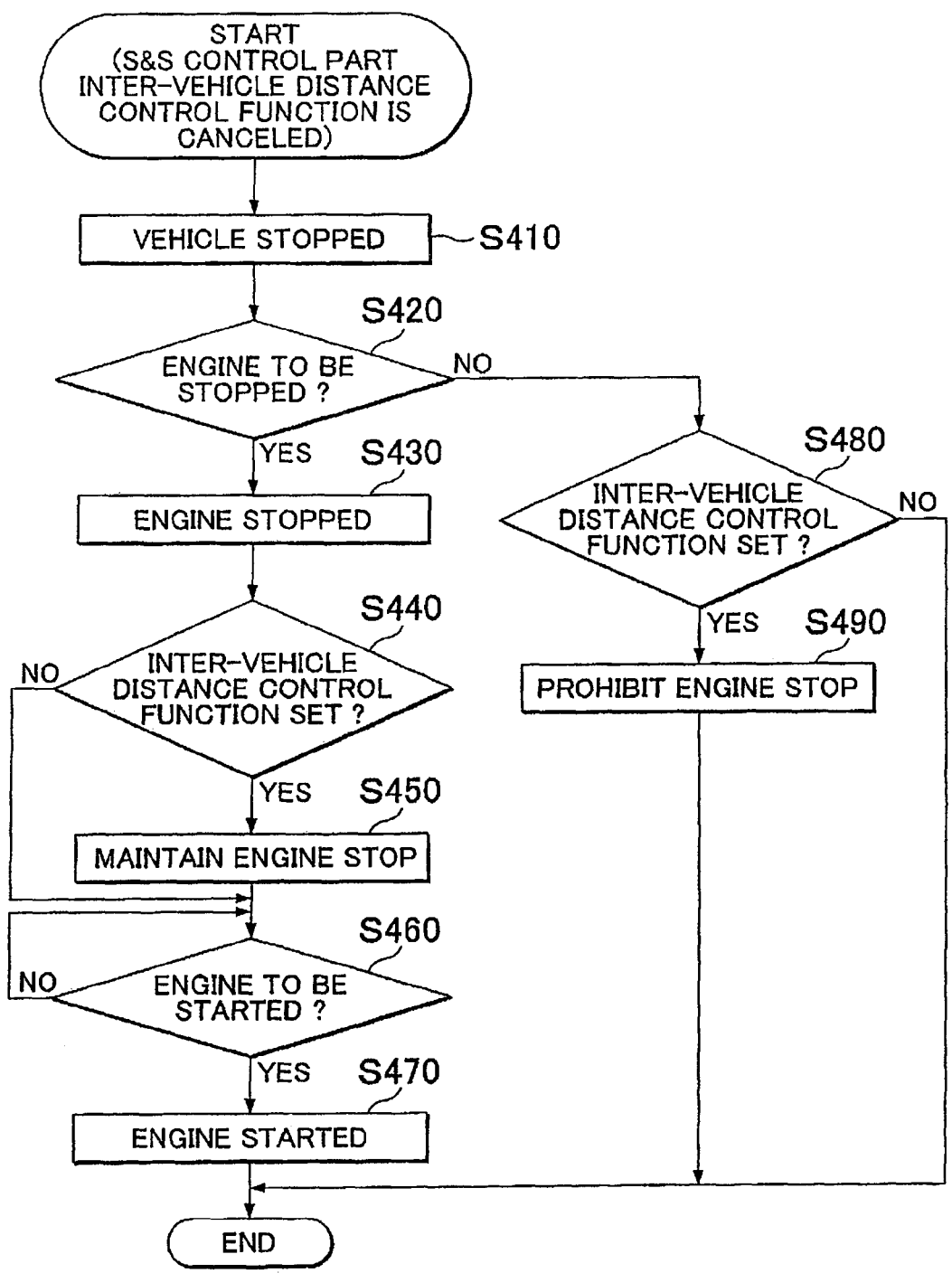
FIG. 6B is an exemplary flowchart showing the operation procedure of the S&S control part in the case where the inter-vehicle distance control function is cancelled.

FIG. 6B is an exemplary flowchart showing the operation procedure of the S&S control part 42 in the case where the inter-vehicle distance control function is not set.

In the case where the inter-vehicle distance control function is not set, the driver operates the brake pedal to stop the vehicle (S410).

The S&S control part 42 determines whether or not to stop the engine when the vehicle is stopped (S420).

The engine stop condition in the case where the inter-vehicle distance control function is not set is "the brake pedal being depressed", therefore, it is determined whether or not the driver sufficiently depresses the brake pedal based on the master cylinder pressure and/or the stroke of the brake pedal.

As a result, in the case where the driver sufficiently depresses the brake Pedal (YES in S420), the S&S control part 42 stops the engine 20 (S430). That is, the engine ECU 26 stops the fuel injection so as to stop the engine 20.

Next, it is determined whether or not the inter-vehicle distance control function is set in the stop state of the engine 20 (S440).

In the case where the inter-vehicle distance control function is not set (NO in S440), since the engine 20 is in stop state, the S&S control part 42 determines whether or not to start the engine 20 based on the engine start condition (S460). The engine start condition in this case is the change of depression to release of the brake pedal.

In the case where the inter-vehicle distance control function is set (YES in S440), the S&S control part 42 continues to maintain the stop state of the engine (S450). The engine start condition in this case is an engine start request from the ACC control part 41 (S460). Therefore, in the case where the engine is in stop state, although the substantive processing is not varied according to whether or not the inter-vehicle distance control function is set, the engine start condition is changed.

Next, in the case where the engine start condition is satisfied and the start prohibition condition is not satisfied, the S&S control part 42 starts the engine 20 (S470). That is, the control in the case where the engine 20 is stopped is identical with the conventional control by the S&S control part 42.

On the other hand, in the case where the engine 20 is not stopped (NO in S420), similarly, it is determined whether or not the inter-vehicle distance control function is set (S480).

In the case where the inter-vehicle distance control function is not set (NO in S480), the processing after the step 5410 will not be repeated during the stop of the vehicle.

In the case where the inter-vehicle distance control function is set (YES in S480), the vehicle-stop-time control part 44 prohibits the stop of the engine (S490). That is, by setting the inter-vehicle distance control function, the ACC control part 41 notifies the BH control part 43 of the braking for confirming vehicle stop, and the BH control part 43 turns on the vehicle stop maintenance function, but the S&S control part 42 according to the present embodiment does not stop the engine 20. In addition, the control after prohibition of the engine stop will be described in the following modified examples.

Thus, in the case where the inter-vehicle distance control function is set in the stop state of the vehicle, if the engine 20 is stopped, the stop state will be maintained, and if the engine 20 is in operation, the operation state will be maintained. Therefore, even if the ACC control part 41 is set during the operation of the engine, the engine 20 will not be stopped, and thus it is possible to prevent the driver feeling uncomfortable.

In addition, if the setting condition for the inter-vehicle distance control function is set to be the situation where the shift lever is in D gear and the preceding vehicle is captured, it is possible to suppress the situation per se where the driver feels uncomfortable.

<Modified examples of the control of the S&S control part> Next, the modified examples of the control of the S&S control part 42 will be described. After the inter-vehicle distance control function is set in the step 5480 of the control procedure in FIG. 6B, the S&S control part 42 can control the time when the prohibition of the engine stop is ended. Hereinafter, the mode of prohibiting the engine stop only immediately after the inter-vehicle distance control function is set, the mode of continuing prohibition of the engine stop during stop of the vehicle, and the mode of stopping the engine by the driver's engine stop operation will be described.

MODIFIED EXAMPLE 1

Figure 7:
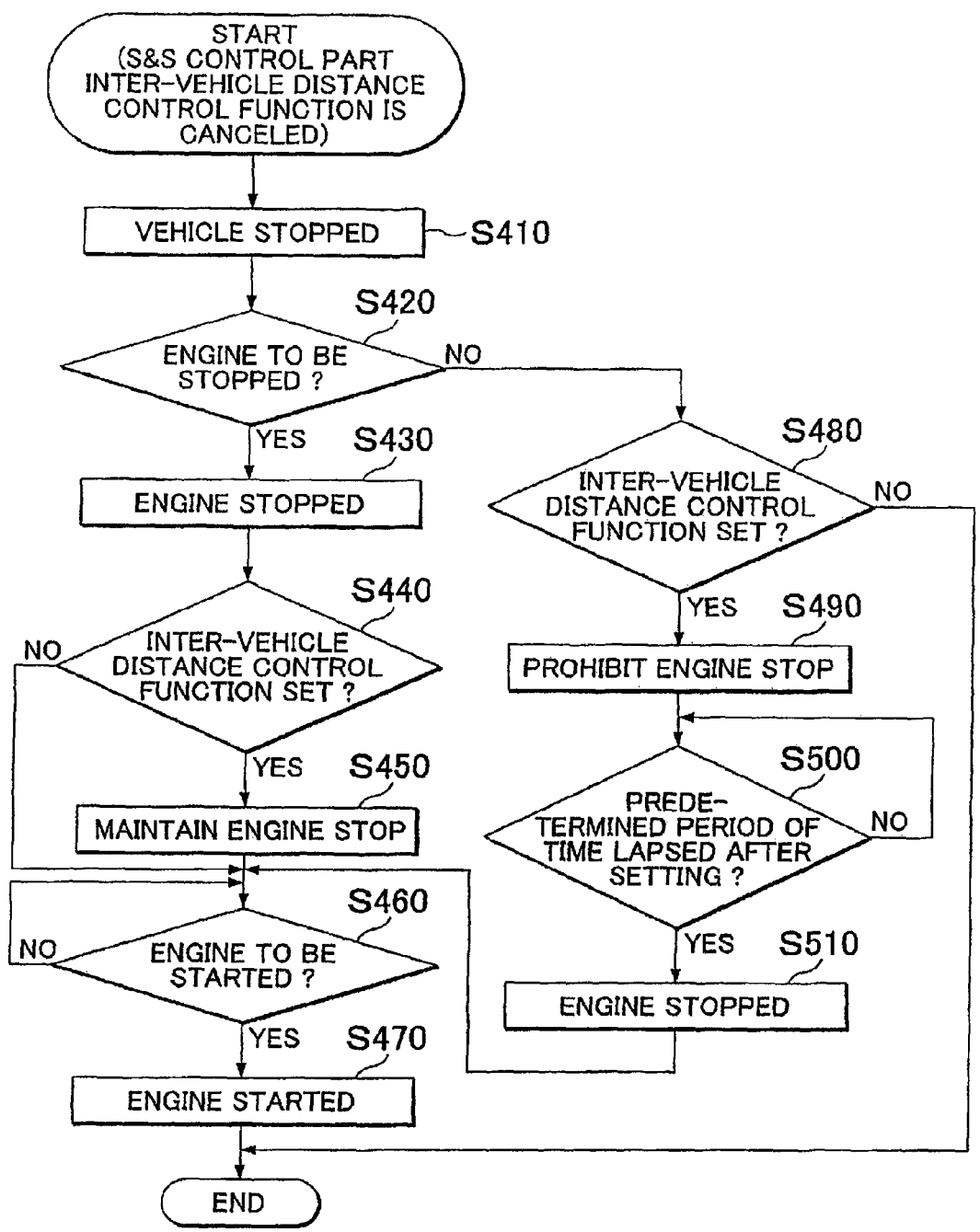
FIG. 7 is an exemplary flowchart showing the operation procedure of the S&S control part in the case where the inter-vehicle distance control function is not set (modified example 1)

FIG. 7 is an exemplary flowchart showing the operation procedure of the S&S control part 42 in the case where the inter-vehicle distance control function is not set. FIG. 7 shows the mode of prohibiting the engine stop only immediately after the inter-vehicle distance control function is set.

In FIG. 7, after the engine is prohibited from stopping in the step S490, the vehicle-stop-time control part 44 determines whether or not a predetermined period of time has lapsed after the inter-vehicle distance control function is set (S500).

Then, if the predetermined period of time has lapsed (YES in S500), the vehicle-stop-time control part 44 stops the engine 20 (S510). That is, since the engine stop condition in the case where the inter-vehicle distance control function is set is satisfied, the engine 20 is stopped after waiting until lapse of the predetermined period of time.

If it is not immediately after the inter-vehicle distance control function is set, even if the engine is stopped, sometimes the driver will not recognize the correlation with the setting of the inter-vehicle distance control function, and thus sometimes would not mistake it as the malfunction of the engine. In addition, for example, since the vehicle has been stopped for a long time, it can be realized that the idle-stop function is activated. In addition, by stopping the engine 20, the fuel economy can be improved.

In addition, when the engine is stopped, the reason for the engine stop may be displayed on the dashboard and the like, or the reason can be output from a speaker. In addition, an alarm lamp may be turned on to indicate that the engine 20 is stopped by the idle-stop function, or an operation voice may be output.

MODIFIED EXAMPLE 2

Figure 8:
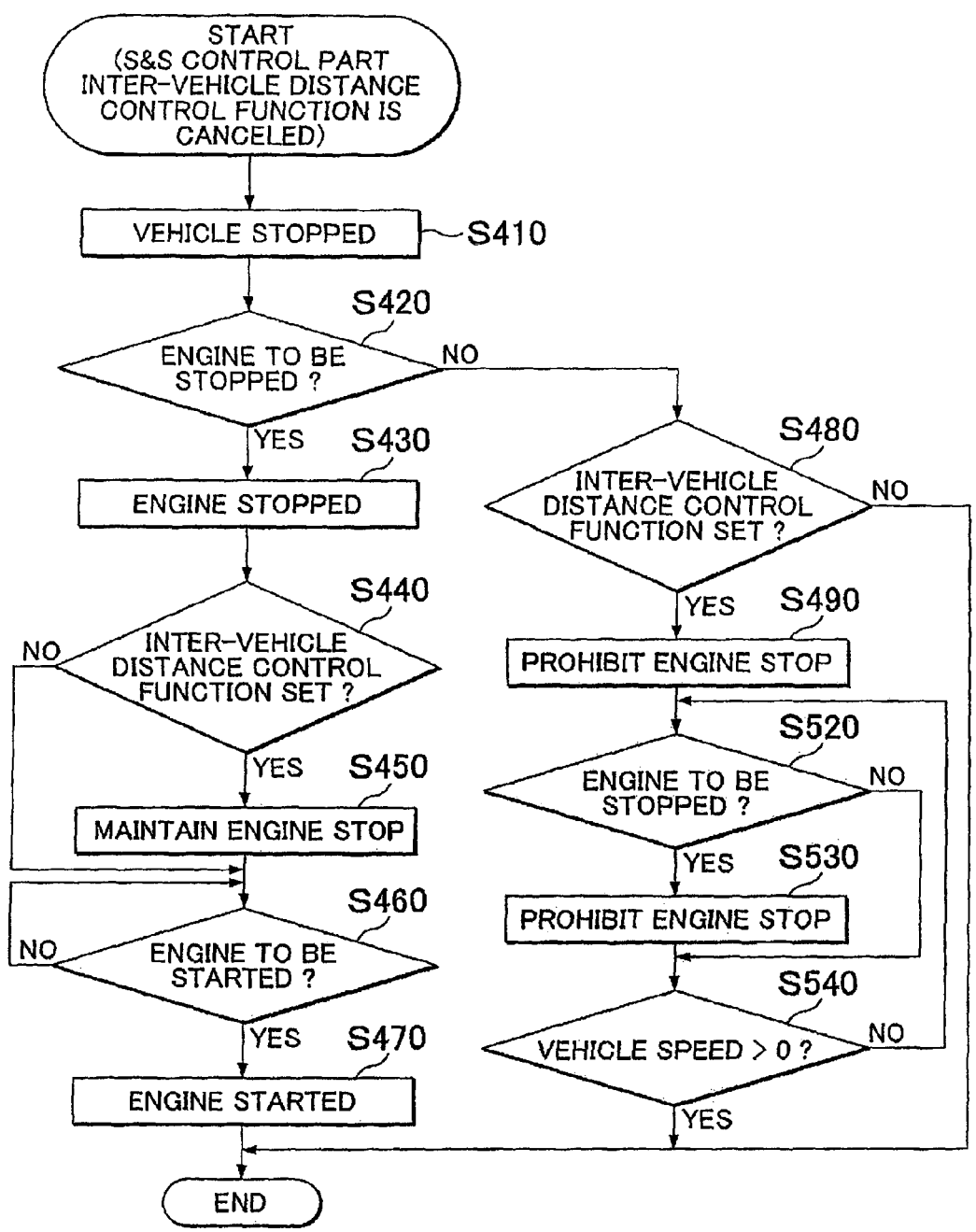
FIG. 8 is an exemplary flowchart showing the operation procedure of the S&S control part in the case where the inter-vehicle distance control function is not set (modified example 2)

FIG. 8 is an exemplary flowchart showing the operation procedure of the S&S control part 42 in the case where the inter-vehicle distance control function is not set. FIG. 8 shows the mode of continuing prohibition of the engine stop during stop of the vehicle.

In FIG. 8, after the engine is prohibited from stopping in the step S490, the vehicle-stop-time control part 44 determines whether or not to stop the engine (S520). Since the engine stop on the condition that the vehicle stop maintenance function is ON is prohibited in the step S490, it is determined, for example, whether or not the depression of the brake pedal and/or the remaining capacity of the battery being a threshold or above is detected.

Even if the engine stop condition is satisfied, the vehicle-stop-time control part 44 will continue to prohibit the engine stop (S530). Thus, in the case where the inter-vehicle distance control function is set during stop of the vehicle, even if an engine stop condition other than the ON of the vehicle stop maintenance function is satisfied, it is possible to prohibit the engine stop during stop of the vehicle. Therefore, the situation where the engine is stopped due to occasional satisfaction of the engine stop condition will not occur.

Next, the vehicle-stop-time control part 44 determines whether or not the vehicle speed is larger than zero (S540). During stop of the vehicle (NO in S540), the prohibition of the engine stop in the step S530 is maintained.

Therefore, in the procedure in FIG. 8, in the vehicle stop stage where the inter-vehicle distance control function is set, the engine 20 will not be stopped. Thus, after the inter-vehicle distance control function is set, even if the engine stop condition other than the setting of the vehicle stop maintenance function is satisfied, the engine 20 will not be stopped, and it is possible to prevent the driver feeling uncomfortable.

In addition, when the vehicle speed becomes larger than zero (YES in S540), since the ACC control part 41 has started the following travel, the vehicle stop maintenance function becomes OFF and the engine stop condition will not be satisfied, so that the vehicle can be started under the control of the ACC control part as conventional.

MODIFIED EXAMPLE 3

Figure 9B:
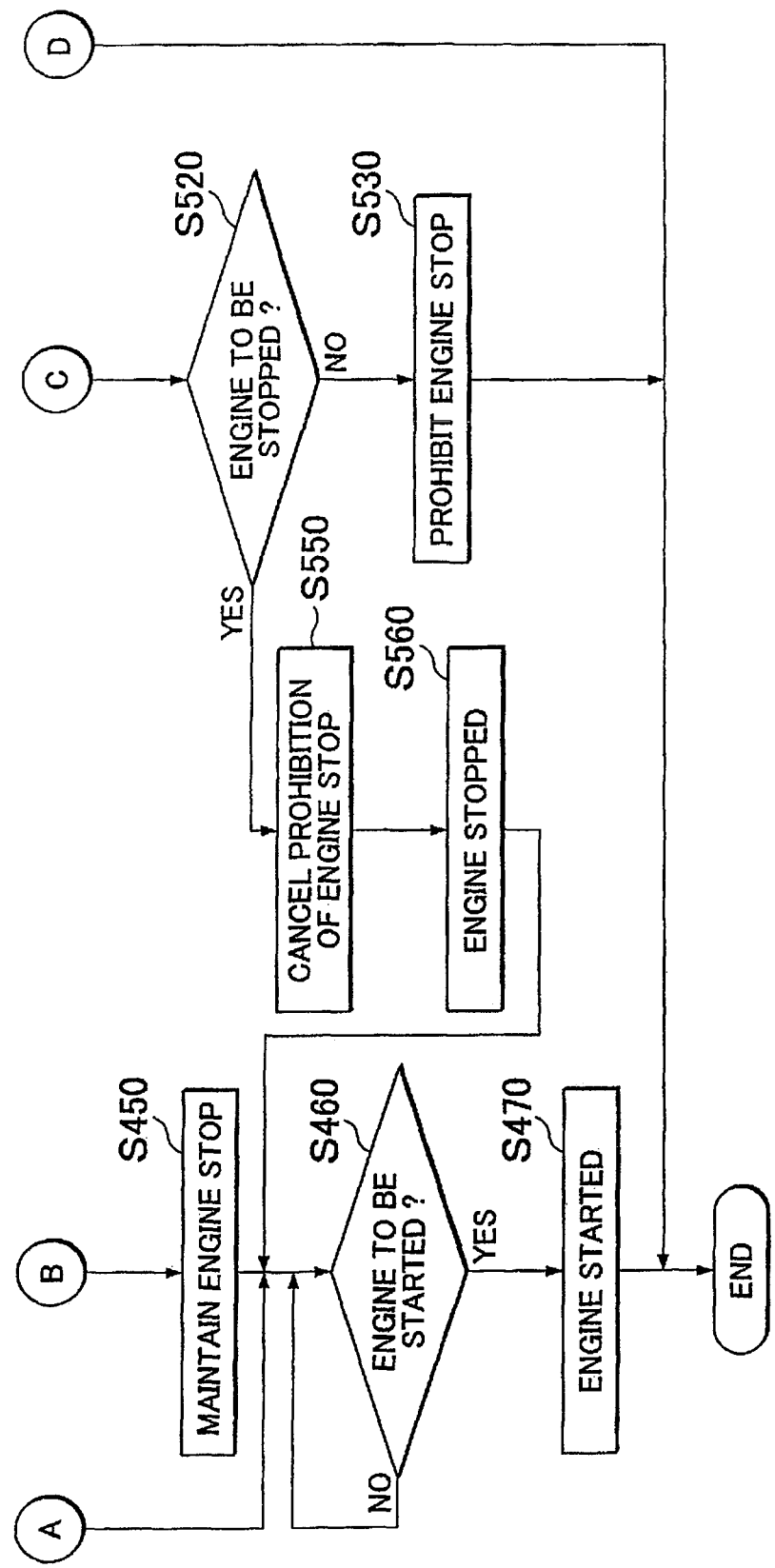

FIGS. 9A and 9B are exemplary flowcharts showing the operation procedure of the S&S control part 42 in the case where the inter-vehicle distance control function is not set. FIGS. 9A and 9B show the mode of stopping the engine by the driver's engine stop operation.

In FIG. 9B, in the case where the engine stop condition is not satisfied in the step S520, the engine stop is continuously prohibited (S530), but in the case where the engine stop condition is satisfied (YES in S520), the vehicle-stop-time control part 44 cancel the prohibition of the engine stop (S550).

Although the engine stop caused by the ON of the vehicle stop maintenance function is prohibited in the step S490, if other engine stop conditions than this (depression of the brake pedal, the remaining capacity of the battery being a threshold or above) are satisfied, the S&S control part 42 can stop the engine (S560).

Thus, immediately after the inter-vehicle distance, control function is set, since the engine stop is prohibited, it is possible to prevent the driver feeling uncomfortable. If the driver wishes to stop the engine and depresses the brake pedal, the engine can be stopped, thereby the fuel economy can be improved.

The modes for carrying out the present invention have been described above by way of embodiments, however the present invention is in no aspects limited to these embodiments, and various modifications and substitutions can be made without departing from the gist of the present invention.

For example, the engine start condition and engine stop condition of the S&S controlling part or the vehicle stop maintenance activation operation of the BH control part can be set as appropriate, and therefore are not limited to those listed in the embodiments.

In addition, in the present embodiments, the braking force is controlled by hydraulic pressure. However, in a vehicle having an electric brake to control the braking force, the pressure reducing control in the present embodiments can be performed by the electric brake. In addition, in the case where part of the braking force is provided by the electric brake, the pressure reducing control in the present embodiments can be performed by either of the hydraulic brake and the electric brake. In addition, part of the braking force may be provided by a parking brake.

What is claimed is:

1. A control apparatus for a vehicle, comprising:
   a distance sensor configured to detect a preceding vehicle;
   an inter-vehicle distance control unit configured to, if set to be active, perform an inter-vehicle distance control in which a vehicle travels by following the preceding vehicle with an inter-vehicle distance corresponding to a vehicle speed while the preceding vehicle is detected by the distance sensor, and travels at a preset constant vehicle speed while the preceding vehicle is not detected by the distance sensor;
   an engine stop-start unit configured to stop the engine when an engine stop condition is satisfied and starts the engine when an engine start condition is satisfied;
   a vehicle stop state maintenance unit configured to provide a braking force for maintaining the vehicle in the vehicle stop state, wherein the engine stop-start unit stops the engine, by activation of the vehicle stop state maintenance unit in the case where the vehicle is stopped by the inter-vehicle distance control unit or the vehicle is stopped by operation of a brake pedal, and after the vehicle is stopped by the operation of the brake pedal, if the inter-vehicle distance control unit is set to be active in the vehicle stop state, an engine operation control unit is configured to maintain an operation state of the engine before the inter-vehicle distance control unit is set to be active to continue to maintain the vehicle stop state.

2. The control apparatus according to claim 1, wherein the inter-vehicle distance control unit is configured to become active in the case where a shift lever is set in D gear and the preceding vehicle is detected by the distance sensor.

3. The control apparatus according to claim 1, wherein before the inter-vehicle distance control unit is set to be active in the vehicle stop state and in the case where the engine is in operation, the engine operation control unit is configured to prohibit stop of the engine.

4. The control apparatus according to claim 3, wherein after the inter-vehicle distance control unit is set to be active in the vehicle stop state and during stop of the vehicle, the engine operation control unit is configured to continue to prohibit stop of the engine.

5. The control apparatus according to claim 3, wherein after the engine operation control unit prohibits stop of the engine, even if the engine stop condition is satisfied by a driver's operation, the engine operation control unit is configured to continue to prohibit stop of the engine.

6. The control apparatus according to claim 3, wherein if a predetermined period of time has lapsed after the inter-vehicle distance control unit is set to be active in the vehicle stop state, the engine is stopped by the engine operation control unit.

7. The control apparatus according to claim 3, wherein after the engine operation control unit prohibits stop of the engine, if the engine stop condition is satisfied by a driver's operation, the engine stop-start unit is configured to stop the engine.

8. An engine control method for a control apparatus for a vehicle, the control apparatus for a vehicle including:
a distance sensor configured to detect a preceding vehicle;
an inter-vehicle distance control unit configured to, if set to be active, perform an inter-vehicle distance control in which the vehicle travels by following the preceding vehicle with an inter-vehicle distance corresponding to the vehicle speed while the preceding vehicle is detected by the distance sensor, and travels at a preset constant vehicle speed while the preceding vehicle is not detected by the distance sensor;
an engine stop-start unit configured to stop the engine when an engine stop condition is satisfied and starts the engine when an engine start condition is satisfied; and
a vehicle stop state maintenance unit configured to provide a braking force for maintaining the vehicle in the vehicle stop state,
wherein the engine stop-start unit is configured to stop the engine, by activation of the vehicle stop state maintenance unit in the case where the vehicle is stopped by the inter-vehicle distance control unit or the vehicle is stopped by operation of a brake pedal, the engine control method comprising:
a step in which after the vehicle is stopped by operation of the brake pedal, if the inter-vehicle distance control unit is set to be active in the vehicle stop state, an engine operation control unit is configured to maintain an operation state of the engine before the inter-vehicle distance control unit is set to be active to continue to maintain the vehicle stop state.

* * * * *